United States Patent Office 2,996,496
Patented Aug. 15, 1961

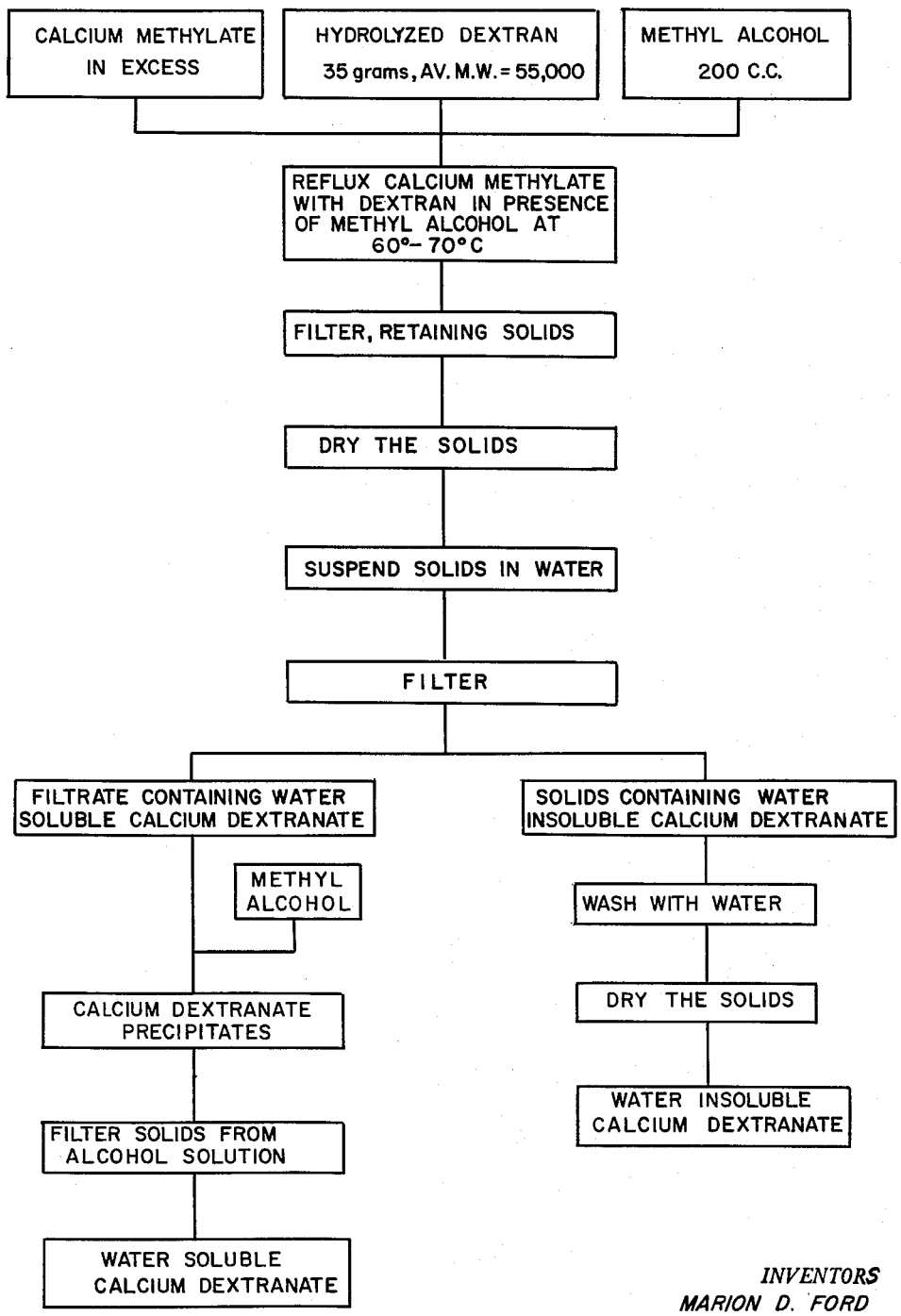

2,996,496
CALCIUM SUBSTITUTION PRODUCTS OF DEXTRAN
Marion D. Ford, Dayton, Ohio, and Leo J. Novak, Mars, Pa., assignors, by mesne assignments, to The Central Pharmacal Company, Seymour, Ind.
Filed June 22, 1956, Ser. No. 594,673
6 Claims. (Cl. 260—209)

This invention relates to calcium substitution products of dextran and to a method for producing the same.

It has been stated in the prior art that when starch is reacted with alkali metal or alkaline earth metal hydroxides in aqueous media, the products obtained are unstable coordinated complexes resulting from adsorption of the alkali metal or alkaline earth metal hydroxide on the oxygen bridges within the anhydroglucose building units, replacing the coordinated water in an equimolecular proportion.

It was then proposed to make a sodium starchate which was a stable compound rather than an unstable coordinated complex by treating starch with a non-aqueous alcoholic solution of sodium hydroxide.

It has been found that, in the case of dextran, stable compounds containing an average of 1.0 or more sodium atoms per anhydroglucose unit cannot be obtained by reacting the dextran with a alcoholic solution of sodium hydroxide. In fact, the dextran product so produced contains, at most, an average of 0.29–0.3 sodium per anhydroglucose unit, which is insufficient to alter noticeably the properties of the starting dextran.

Unlike starch as reported in the prior art, stable sodium compounds of dextran are obtained by reacting dextran with aqueous sodium hydroxide and such compounds can be obtained containing an average of 1.0 to 3.0 sodium atoms per anhydroglucose unit. The sodium dextran can be used to produce other derivatives, including carboxymethyl ethers containing an average of from 1.0 to 3.0 carboxymethyl groups per AGU and which have properties, especially gelling properties, that are quite different from those of the parent dextran.

These differences between dextrans and starch as reported in the prior art result from the fact that, although both the dextrans and starch may be classified broadly as glucopyranoses or polysaccharides, and both contain, normally, three available hydroxyl groups per anhydroglucose unit, structural and other differences exist in the case of dextrans which sharply distinguish those materials from other glucopyranoses including starch.

Some of the differences between starch and dextrans are listed below:

| Starch | Dextran |
|---|---|
| Anhydroglucose units linked alpha-1,4. | anhydroglucose units linked alpha-1,6 (at least predominantly). |
| contains free $CH_2OH$ group in the repeating structure. | does not contain free $CH_2OH$ group in the repeating structure. |
| give the iodine test. | does not give the iodine test. |
| variable granule structure constituting morphological means of identification. | amorphous. |
| native starch insoluble in cold water. | may be soluble in cold water even in the native state. |
| comparatively low molecular weight. | molecular weight (native) dextran estimated in millions. |
| plant products. | bacterial products. |
| susceptible to action of amylase type enzymes. | not susceptible to action amylase type enzymes. |
| not resistant to typical amolytic bacterial enzymatic degradation. | Resistant to typical amolytic bacterial enzymatic degradation. |
| non-antigenic. | partial antigens (haptenes). |
| contains organic phosphorus when freshly isolated. | synthesis does not require mediation of any phosphorylated sugar. |

The occurrence of the three hydroxyl groups per AGU in dextran is not the only factor to be considered. As is apparent from the foregoing comparison of starch and dextran, the differences in dextran, particularly the absence of the free $CH_2OH$ group in the repeating structure (which group is characteristic of starch, dextrin and cellulose) and the predominance of the unique 1,6 linkages therein, must all be taken into account and render it impossible to predict either the behavior of the dextrans under a given set of reaction conditions, or the properties of the reaction products, from experience with starch or other glucopyranoses.

This is shown by the fact that, while starch can be reacted with an alcoholic, non-aqueous solution of sodium hydroxide to produce products containing appreciable amounts of sodium, the same highly substituted products of dextran cannot be obtained under those conditions.

We have found that, unlike the hydroxide of the monovalent alkali metals such as sodium, the hydroxides of the divalent metals of the alkaline earth group, such as calcium and barium, can be used in the reaction with dextran in non-aqueous alcoholic medium, to produce calcium dextranates containing a substantial amount of calcium (calculated as CaO) and which are stable in air.

The primary object of this invention, therefore, is to provide new, stable, compounds of dextran and calcium.

The new products are obtained by reacting an alcoholate of calcium with dextran, in alcohol.

The solubility of the products obtained by reacting dextrans with the hydroxide of the divalent metal of the alkaline earth metal group, in alcohol, are dependent to some extent on the divalent metal. Thus, in general, the reaction products obtained using the hydroxides of the heavier metals, e.g., barium, are water-insoluble. However, in the case of the calcium dextranates, it is found that the particular dextran used also influences the properties of the products.

Native dextran as biosynthesized from sucrose by dextran synthesizing strains of bacteria of the types of *Leuconostoc mesenteroides* and *L. dextrainicum* has an extremely high molecular weight, estimated to be in the millions. It can be hydrolyzed to dextran of lower molecular weight.

We find that, in the case of the calcium derivatives, the molecular weight of the dextran has a direct influence on the water-sensitivity of the product. Thus, when calcium methylate is reacted with dextran of a molecular weight between 2000 and 50,000, the resulting calcium dextranate is soluble in cold water. On the other hand, when the dextran has a molecular weight between 50,000 and about 250,000 the calcium dextranate is less readily soluble in water and with dextrans of molecular weight above 250,000 and up to that of native, unhydrolyzed dextran, the calcium products are substantially insoluble in warm water.

The dextran reacted with the sodium alcoholate should be thoroughly dry to avoid hydrolytic action. However, the molecular weight of the dextran is not critical unless a calcium derivative of specific water-sensitivity is desired.

The dextrans are substantially insoluble in the absolute alcohols. Therefore, the molecular weight of the dextran selected as starting material does not materially influence the course of the reaction. Native dextrans of very high molecular weight react in essentially the same way with the calcium ions as do dextran hydrolyzates of molecular weight down to about 2000.

The alkaline earth metal alcoholate used as one reactant may be prepared by dissolving the alkaline earth metal hydroxide in alcohol. The solution is usually prepared immediately prior to the addition of the dextran thereto so that the introduction of impurities, more particularly moisture, is avoided.

The reaction may be carried out by refluxing the divalent metal alcoholate and dextran in alcohol under anhydrous conditions, preferably in the alcohol corresponding to the metal alcoholate. The reaction, at least in the initial stages, is exothermic and generally no heat need be supplied to the reaction mass to initiate the refluxing.

On occasion, it may be necessary to cool the reactants, particularly when the surrounding temperature is such as to expedite the reaction undesirably. In the initial stages, the reaction should be controlled so that it proceeds slowly at a temperature not higher than 70° C.

However, when the heat generated in the reaction becomes inadequate to sustain the chemical change, resulting from replacement of hydrogen atoms of the dextran by the divalent metal atoms, it is preferable, in order to insure complete reaction, to supply additional heat sufficient to maintain refluxing of the mixture. This will be apparent from the examples given below.

The following concurrent reactions are believed to take place, R representing the dextran molecule and X a divalent metal of the alkaline earth group:

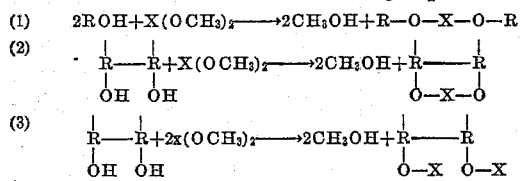

These reactions are not exclusive since others of a more complicated nature may be occurring. It may be considered that calcium alcoholate, free calcium and possibly some small amount of calcium hydroxide are present in the solution and can take part in the replacement of hydrogen atoms of the dextran by calcium atoms.

The invention will be more fully understood by reference to the accompanying flow charts and the specific example set forth by way of illustration.

In the drawings:

The single figure illustrates the steps involved in the formation of water-soluble calcium dextranate and water-insoluble calcium dextranate.

EXAMPLE I

Calcium methylate is prepared by reacting 25 grams of metallic calcium with 100 cc. of absolute methyl alcohol. The mixture is refluxed gently in a flask provided with a condenser. The reaction takes place readily.

About 200 cc. of methanol are added to the calcium methylate with stirring, after which about 35 grams of dry, hydrolyzed dextran having an average molecular weight of about 55,000 and an intrinsic viscosity of 0.19 are added to the solution. An excess of calcium methylate is used, to avoid unreacted dextran and simplify purification of the reaction product.

The mixture of dextran and calcium methylate is then refluxed slowly under the influence of heat generated as the reaction (or concurrent reactions) proceeds.

The heat generated by the reacting calcium methylate and anhydrous dextran in the presence of the alcohol is generally sufficient to induce self-refluxing of the solution over a period of about two hours. The temperature is maintained at about 60° C., and not above 70° C., during such period, to avoid loss of material. This may be accomplished by the use of a reflux condenser open to the atmosphere.

After the two hour self-refluxing period, the reaction rate tends to decrease. It may then be necessary to apply heat from an external source to maintain the reaction temperature at 60° C. to 70° C., so that the reaction will be driven substantially to completion.

The final reaction mass resembles a slush. It is filtered to recover the solids, which are dried for about twelve hours in vacuo at about 70° C. The dried material is purified by suspending it in about 500 ccs. of distilled water and shaking the suspension for about a half hour to insure that all of the water-solubles are dissolved. The aqueous mass is then filtered. The filtrate contains calcium dextranate in the soluble form while the solids retained on the filter comprise water-insoluble calcium dextranate together with some water-insoluble impurities.

The water-soluble calcium dextranate is recovered from the filtrate by mixing the latter with an equal volume of methanol, which precipitates the dextranate. The precipitate is again purified and reprecipitated with methanol. Generally, two precipitations are sufficient to remove all contaminants such as small amounts of calcium hydroxide. The purified water-soluble calcium dextranate is then dried.

The solid retained on the filter comprises, as has been noted, water-insoluble calcium dextranate. This product is the calcium substitution product of a dextran having molecular weight above 50,000 and which is present in the hydrolyzed dextran of average molecular weight about 55,000, and which is, usually, a mixture of dextran fractions of varying molecular weight.

The calcium dextranates are, when dry, white powders which are stable in the atmosphere and readily decomposed when treated with aqueous solutions of pH below 8.0. In acetic acid solution the decomposition results in the liberation of dextran and on testing it is found that the liberated dextran does not show a reaction with Fehling's solution, indicating that no glucose was formed in the reactions resulting in production of the calcium dextranates.

Other divalent alkaline earth metal dextranates, such as the barium and magnesium dextranates are produced in the same manner as the calcium dextranates, using the divalent metal alcoholate in alcohol. The alcoholate used is preferably the ethylate or methylate, but propylates and butylates may also be used.

The products usually contain from 8% to 20% of the divalent metal.

The calcium dextranates prepared according to the example have the following characteristics—

*Calcium dextranate [1]*

|  | Water-soluble | Water-insoluble |
|---|---|---|
| Percent calcium as CaO | 9.0–12.0 | 8.0–13.0 |
| Percent dextran | 91.0–88.0 | 92.0–87.0 |
| Intrinsic (N) viscosity | 0.05–0.13 | 0.13–0.25 |
| Range of pH for 1% solution | 11.0–12.0 |  |

[1] The hydrolyzed dextrin used in synthesizing these compounds had an intrinsic viscosity of 0.195.

Similar results are obtained using native, unhydrolyzed dextran, except that since the dextran has not been hydrolyzed and the average molecular weight is considerably above 250,000, the divalent alkaline earth metal derivatives, even the calcium derivatives, are invariably water-insoluble, even when the starting dextran is soluble in water.

The divalent alkaline earth metal alcoholate is used in excess, about 5% to 15% or more in excess of the stoichiometric being suitable.

It will be apparent that the invention provides new dextran derivatives which are stable compounds and which can be used for varying purposes, including use as intermediates for the synthesis of other products. For example, other organic derivatives of dextran may be produced by reacting calcium dextranate with an organic compound containing a strongly electronegative radical, such as benzyl dextran.

Various changes and modifications may be made in carrying out the invention, without departing from the spirit and scope thereof, and therefor it is to be understood that it is desired to comprehend such changes and modifications of the invention as may fall within the scope of the appended claims.

What is claimed is:

1. As a new product, a stable, water-soluble calcium substitution product of a dextran having an average molecular weight between 2000 and about 50,000 and which is a dry white powder.

2. As a new product, a stable, water-insoluble calcium substitution product of a dextran having an average molecular weight above about 250,000 and containing from about 8% to about 13% by weight of calcium, and which is a dry white powder.

3. A method of making stable alkaline earth metal substitution products of dextran which comprises refluxing a mass consisting of dextran comprising fractions of molecular weight between 50,000 and 250,000 and fractions of molecular weight above 250,000, a 5% to 15% stoichiometric excess of an alcoholate of the metal in which the alcohol contains from 1 to 4 carbon atoms, and an alcohol corresponding to the alcohol in the metal alcoholate, at a temperature between 60° C. and 70° C., filtering the reaction mass, drying the solids at about 70° C. to obtain a mass comprising water-insoluble alkaline earth metal substitution products of dextran and water-soluble substitution products of dextran, and separating the products of the different water-solubility by suspending the solids in water, agitating to dissolve out the water-soluble products, and filtering the aqueous mass to obtain a filtrate containing the water-soluble products and a residue comprising the water-insoluble products.

4. The method of making stable calcium substitution products of dextran according to claim 3, characterized in that the mass refluxed consists of calcium alcoholate, dextran, alcohol corresponding to the calcium alcoholate, at a temperature between 60° C. and 70° C.

5. The method of making stable calcium substitution products of dextran according to claim 3, characterized in that the mass refluxed consists of methylate, the dextran, and methanol.

6. In the process of making a calcium substitution product of dextran according to claim 5 characterized in that the refluxing is performed, at least during part of the refluxing period, under the influence of heat generated in the exothermic reaction between the dextran and methylate.

References Cited in the file of this patent
UNITED STATES PATENTS

| | | |
|---|---|---|
| 2,518,135 | Gaver | Aug. 8, 1950 |
| 2,572,923 | Gaver et al. | Oct. 30, 1951 |
| 2,671,779 | Gaver et al. | Mar. 9, 1954 |